Figure 1:
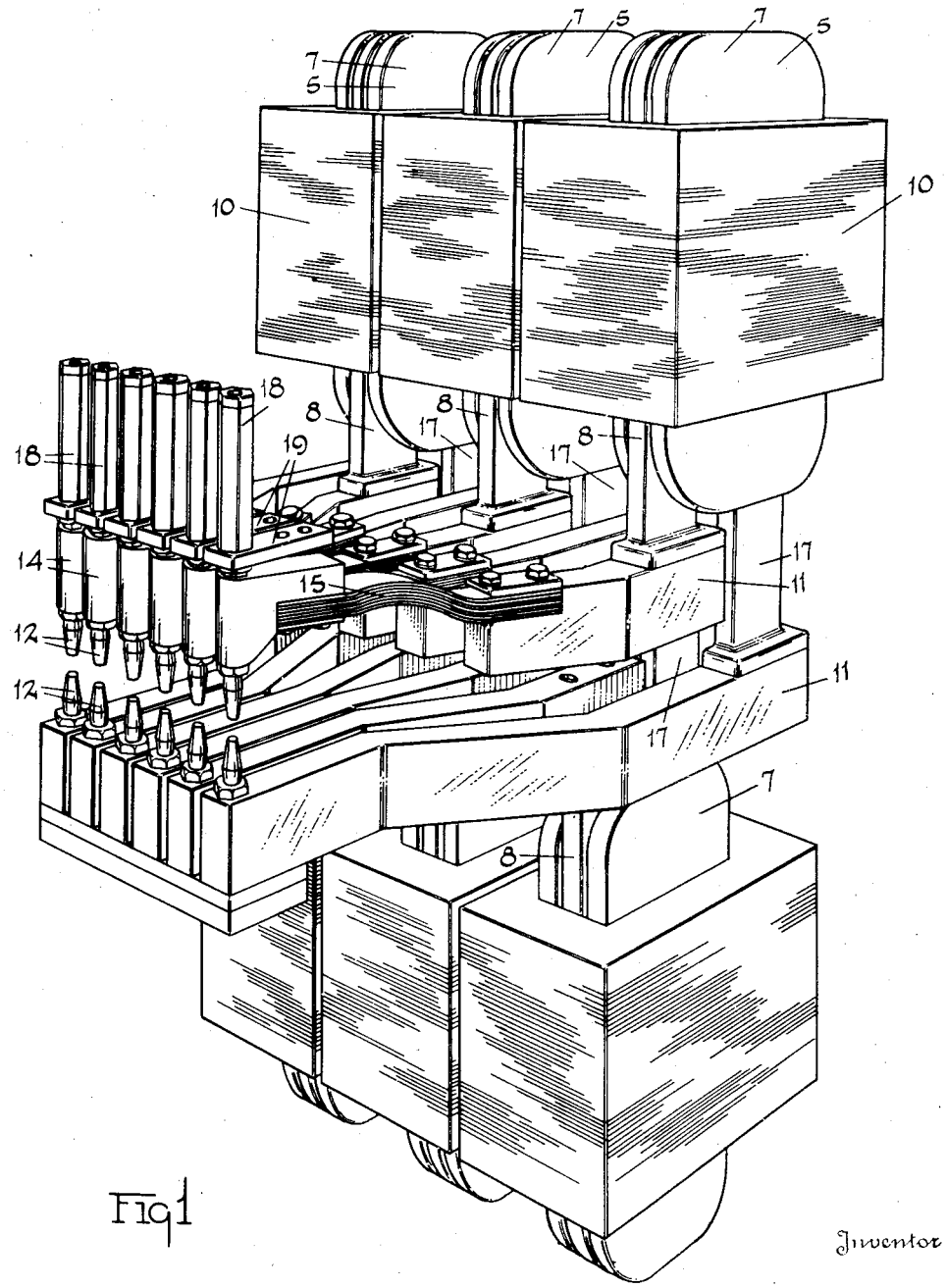

May 20, 1941.　　　W. H. MARTIN　　　2,242,867
WELDING MACHINE
Filed Feb. 24, 1940　　　3 Sheets-Sheet 1

Inventor
William H. Martin
By Faust H. Remington
Attorney

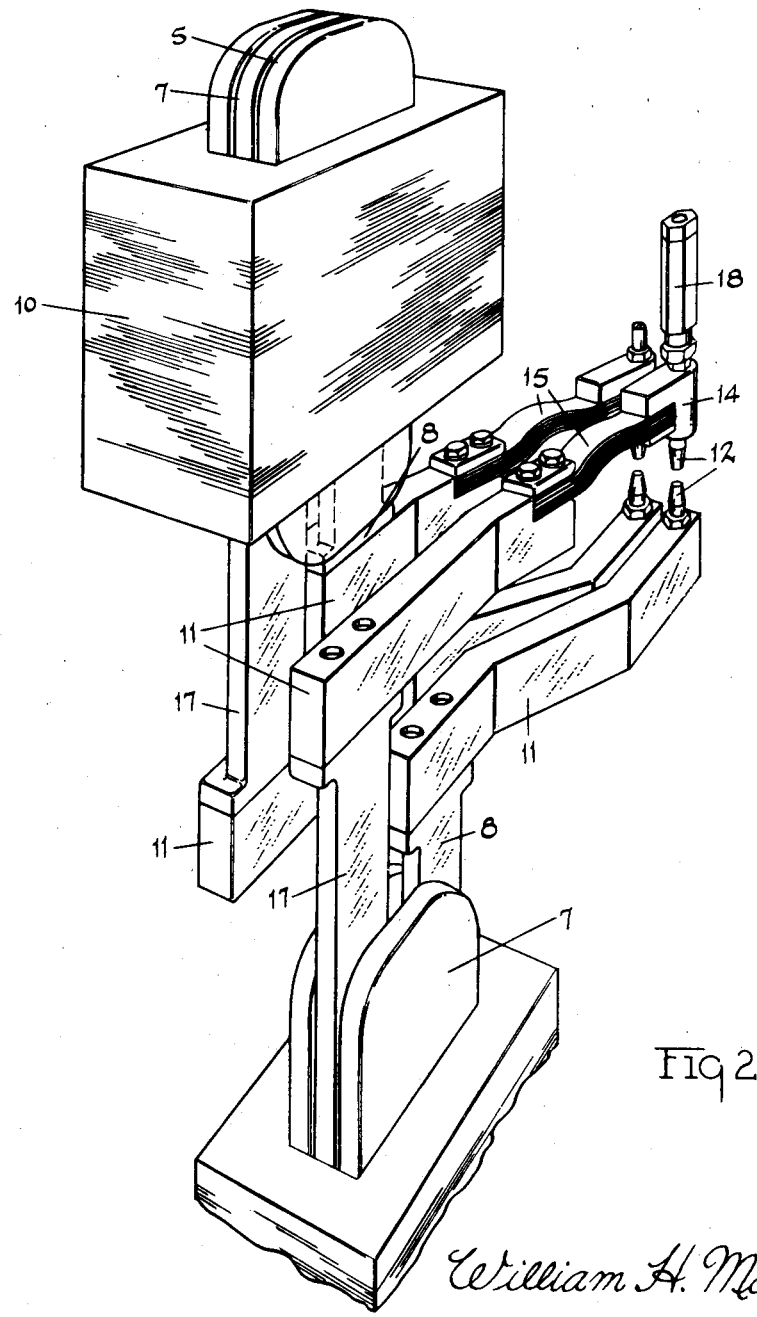

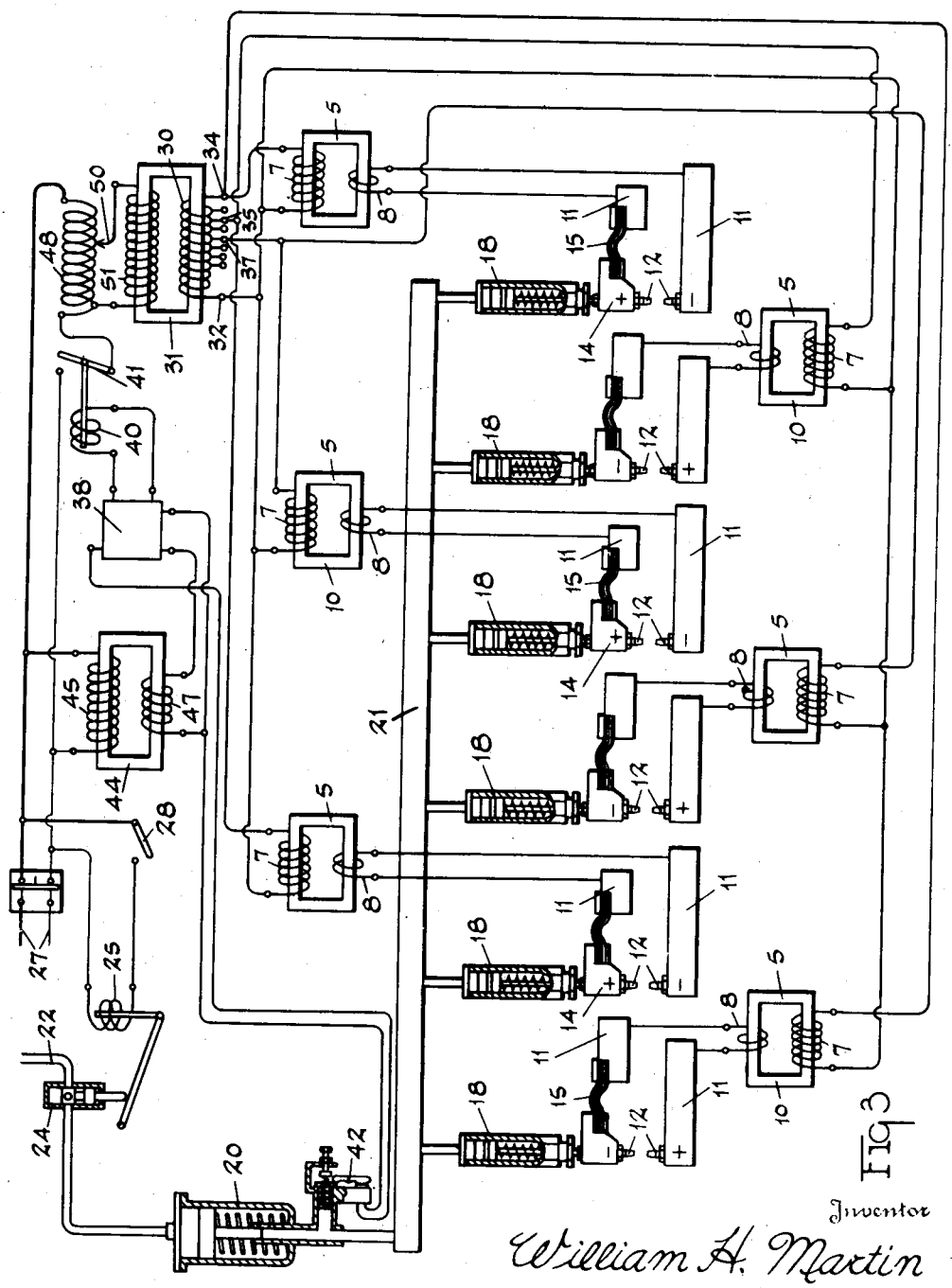

Patented May 20, 1941

2,242,867

UNITED STATES PATENT OFFICE 2,242,867

WELDING MACHINE

William H. Martin, Pleasant Ridge, Mich.

Application February 24, 1940, Serial No. 320,625

3 Claims. (Cl. 219—4)

My invention has for its object to, simultaneously, produce a plurality of closely positioned welds and prevent material potential loss and current reduction through the electrodes.

The invention, also, has for its object to produce an efficient welding machine, wherein a plurality of spot welds may be, simultaneously, formed between electrodes disposed on contiguously located secondary protruding terminal bars of a plurality of transformers and located in substantially parallel arrangement.

The invention, also, has for its object to dispose transformers in juxtaposed relation to permit location of their terminals in close, parallel, alternate relation as to their direction of current flow to reduce current reaction and enable the production of, substantially, the same current flow between the electrodes in the production of simultaneously formed welds, by the same applied potential, except as to the outer electrodes.

Structures containing the invention may partake of different forms and may be varied in their details and still embody the invention. To illustrate a practical application of the invention, I have selected a welding machine as an example of the various structures containing the invention and shall describe the selected structure hereinafter. The particular structure selected is shown in the accompanying drawings.

Fig. 1 illustrates a perspective view of a part of the machine, wherein is disclosed the terminal bars and the welders for operating the electrodes to engage the work. Fig. 2 illustrates a perspective view of a pair of the transformers to more clearly show the arrangement of the connected parts. Fig. 3 illustrates, diagrammatically, the electric connections between the parts of the machine.

The parts, shown in Fig. 1, may be mounted in a machine frame of any form for convenience of operation. The machine is provided with a plurality of transformers 5, each having primary windings 7 and secondaries 8 in the form of shaped bars that may be bent to produce but a few turns, such as 1, 2, or 3 turns, and located between sections of the primary coils, in order to produce large secondary currents. The primaries 7 and the secondaries 8 are mounted on cores 10 of laminated iron or, preferably, are located within and surround cross parts of the cores.

In order to dispose the transformers in closely confined relation and the secondary terminal bars in parallel, contiguous arrangement to closely locate the electrodes, the transformers and secondary terminal bars are divided into two sets, one set of each being located above the other set, substantially as shown in Fig. 1. The longitudinal axes of the bars are located, substantially, parallel to each other and in planes one above the other and separated from each other by a short distance so as to enable the insertion of the work between the electrodes 12 located on the ends of the bars 11 and so as to dispose the contiguously located secondary bars 11 of each set alternate, with reference to the potentials produced in the bars by the transformers. The upper set of the secondary terminal bars 11 comprise the blocks 14 and the flexible laminated conductors 15 that connect each block to a secondary. In order to locate the secondary terminal bars in, substantially, parallel planes and connect them to the secondaries, each secondary has an extended end portion 17 that is connected to the more remote set of terminal bars 11. The flexible laminated conductor strips 15, which form a part of the upper set of the secondary terminal bars, enable relative movement of the terminal blocks 14 in the operation of the machine. The terminal blocks 14 are operated by the welder cylinders and pistons 18, which are supported on suitable bars 19 that may be secured by bolts to an overhanging part of the frame of the machine. The upper electrodes 12 are mounted in the terminal blocks 14 and in alignment with the lower electrodes 12, which are mounted in the lower terminal bars 11.

In the operation of the welding machine, the welder cylinders 18 are connected to a booster 20 by a manifold 21 and, when the booster 20 is operated, fluid pressure is transmitted through the manifold 21 to the cylinders 18 to produce simultaneous operation of the upper of the electrodes 12 to press the work between the upper and lower electrodes 12. The booster 20 may be connected to a pipe 22 that is connected with a source of air pressure, by means of a valve 24. Upon the operation of the valve 24, the booster 20 is operated and the pressure is transmitted to the cylinders 18 through, preferably, oil that may be located in the booster 20 and cylinders 18. The valve 24 may be electrically operated, by means of a solenoid 25 that may be connected by a switch 26 to a source 27 of supply of electric current. The primaries 7 of the contiguous transformers 5 are connected to the secondary 30 of a variable transformer 31 to produce not only the alternate potentials of the contiguously located secondary terminals bars 11 by the direction of current flow through the primaries, but, also, to produce the required potentials of the electrodes. The alternate relation of the potentials of the terminal bars greatly reduce the requisite potential and, thus, produce approximately the same potential difference at the electrodes by, substantially, the same potential of the secondary 30. By the alternate relationship of the potentials of the contiguously located terminal bars, the total potential loss is greatly reduced, by reason of the reduction of the inductive reactance that will exist by the simultaneous flow of the welding current through the bars in opposite directions. Thus, with reference to the outer terminal bars, they will require a larger potential in order to produce, substantially, the same flow of current though their electrodes as is produced by the inner of the terminal bars. Consequently, the primaries 7 of the transformers 5 of the outermost of the bars will be connected to the outer terminals 32 and 34, while the primaries of the other transformers may be connected to the inner of the coils of the secondary 30 of the transformer 31 through the terminals 32 and 35 or 37. Preferably, the potentials, taking them in the order of the transformers from the outermost to the central transformer or transformers that will produce the more efficient results, will be approximately the ratio of 4:2¾:2 and, consequently, the primaries of the transformers contiguous to the outer of the transformers will be connected to a terminal, such as the terminals 32 and 35 of the secondary 30 to produce, substantially, the ratio of potentials as designated, and the central transformers will, also, be connected to an inner terminal, such as the terminals 32 and 37 of the secondary. Any number of transformers may be used to produce, simultaneously, any number of welds. Thus, there may be any number of central transformers, whose terminal bars equally counteract to produce the same result with a relatively low potential; a pair of outer transformers, whose terminal bars may not be so effectively acted upon; and a pair of outermost transformers, whose terminal bars are reacted upon by the bars of the inner transformers, but possibly not with the effectiveness with which the terminal bars of the innermost transformers are affected.

The welding current at the potentials, as determined by the variable transformer 31, will contine to flow, according to the adjustment of the timer relay 38, which controls the period of flow of the current through a solenoid 40 of the welder switch 41. The timer 38 is controlled by a pressure switch 42 that is operated by the pressure of the liquid through which pressure is transmitted from the booster 20 to the cylinders 18 and, when the pressure in the pressure switch 42 reaches the desired welding pressure, a circuit is established through the timer 38, which causes the current to flow through the solenoid 40 to close the switch 41. The current of the timer 38 may be received from a transformer 44 having the primary 45 that is connected to the source of supply of electric current 27, the timer 38 and the switch 42 which is connected to the secondary 47. The switch 41 closes the circuit of the autotransformer 48 from the source of supply 27 and the current of the autotransformer 48 is adjustably varied by the contactor 50 to vary the current that is directed through the primary 51 of the variable transformer 31.

Thus, the flow of the current may be adjusted to produce the desired potentials of the welding current of each of the transformers to produce the particular necessary potential at the electrodes to cause a flow of the desired current quantity through the work.

Where the metal varies, the connections with the autotransformer 48 and the variable transformer 31 may be altered to produce, at the contacts of the variable transformer, the required potential and produce, in the primaries of the welder transformers 5, the requisite potentials to produce the required currents in the secondaries of the transformers 5.

I claim:

1. In a welding machine, a plurality of transformers having terminal bars contiguously located and having electrodes mounted on the ends of the bars, one set of the electrodes located above the work and the other set located below the work; certain of the bars having flexible parts intermediate their ends; the plurality of transformers electrically connected to the electrodes through the terminal bars to produce opposite potentials at the electrodes of the contiguous terminal bars of each set and opposite potentials at the coacting electrodes on opposite sides of the work; means for operating the electrodes to cause the electrodes to engage the work; and means for causing simultaneous flow of current through the terminal bars, the electrodes, and the work.

2. In a welding machine, a pair of sets of transformers, each transformer having a pair of terminal bars; the terminal bars of the transformers located on opposite sides of the work and in contiguous parallel arrangement; the terminal bars on one side of the work having flexible parts intermediate their ends; electrodes located on the ends of the terminal bars; the electrodes of the bars on one side of the work located in opposed relation to the electrodes of the bars on the other side of the work; a source of current, means for connecting the source of current to the transformers to produce opposite potentials in the electrodes of the terminal bars on opposite sides of the work and opposite potentials in the electrodes of contiguous terminal bars on each side of the work; and means for operating the electrodes to simultaneously produce the welds.

3. In a welding machine, a pair of sets of transformers having terminal bars contiguously located and having electrodes mounted on the end parts of the bars and spaced from each other to receive the work; certain of the bars having relatively movable end parts; the plurality of transformers electrically connected to the electrodes through the terminal bars to produce opposite potentials at the electrodes of the contiguously located terminal bars and opposite potentials at the coacting electrodes of the bars; means for operating the electrodes to cause the electrodes to engage the work; and means for causing simultaneous flow of current through the contiguously located terminal bars, the electrodes, and the work in opposite directions.

WILLIAM H. MARTIN.